(12) United States Patent
Moon et al.

(10) Patent No.: US 7,890,110 B2
(45) Date of Patent: Feb. 15, 2011

(54) RADIO NETWORK CONTROLLER, MOBILE STATION, AND MOBILE COMMUNICATION METHOD

(75) Inventors: Sung Uk Moon, Yokohama (JP); Minami Ishii, Yokohama (JP); Takehiro Nakamura, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 242 days.

(21) Appl. No.: 12/188,655

(22) Filed: Aug. 8, 2008

(65) Prior Publication Data
US 2009/0028113 A1 Jan. 29, 2009

Related U.S. Application Data

(62) Division of application No. 11/199,249, filed on Aug. 9, 2005.

(30) Foreign Application Priority Data

| Aug. 10, 2004 | (JP) | ............................. 2004-233889 |
| Sep. 24, 2004 | (JP) | ............................. 2004-278310 |
| Feb. 17, 2005 | (JP) | ............................. 2005-041415 |

(51) Int. Cl.
*H04W 36/00* (2009.01)
(52) U.S. Cl. ..................... 455/438; 455/3.06
(58) Field of Classification Search .............. 455/3.06, 455/436, 439, 442, 438
See application file for complete search history.

(56) References Cited

U.S. PATENT DOCUMENTS 6,363,248 B1 * 3/2002 Silverman ................... 455/417

| | | |
|---|---|---|
| 2002/0027891 A1 | 3/2002 | Mimura |
| 2002/0119779 A1 | 8/2002 | Ishikawa et al. |
| 2004/0081125 A1 | 4/2004 | Ranta-Aho et al. |
| 2004/0147266 A1* | 7/2004 | Hwang et al. ............... 455/445 |
| 2004/0162072 A1* | 8/2004 | Sigle et al. ................ 455/436 |
| 2004/0224719 A1* | 11/2004 | Nounin et al. ........... 455/553.1 |
| 2005/0070285 A1* | 3/2005 | Goransson .................. 455/436 |
| 2006/0014544 A1* | 1/2006 | Tolli ............................ 455/453 |

FOREIGN PATENT DOCUMENTS

| CN | 1370021 A | 9/2002 |
|---|---|---|
| EP | 1 377 088 A2 | 1/2004 |
| EP | 1 420 551 A2 | 5/2004 |
| JP | 11-136729 | 5/1999 |
| JP | 2002-232929 | 8/2002 |
| JP | 2003-18640 | 1/2003 |
| JP | 2003-189347 | 7/2003 |
| JP | 2004-32204 | 1/2004 |
| WO | WO 95/32591 | 11/1995 |

OTHER PUBLICATIONS

"3$^{rd}$ Generation Partnership Project; Technical Specification Group Radio Access Network; Introduction of the Multimedia Broadcast Multicast Service (MBMS) in the Radio Access Network (RAN)", Stage 2 (Release 6), 3GPP TS 25.346 V6.1.0, Jun. 2004.

* cited by examiner

*Primary Examiner*—Tu X Nguyen
(74) *Attorney, Agent, or Firm*—Oblon, Spivak, McClelland, Maier & Neustadt, L.L.P.

(57) ABSTRACT

A radio network controller comprises a cell selector configured to select a cell to use by a mobile station after data reception, and a mobile station controller configured to control the mobile station to communicate by radio using the cell selected by the cell selector after the data reception.

10 Claims, 5 Drawing Sheets

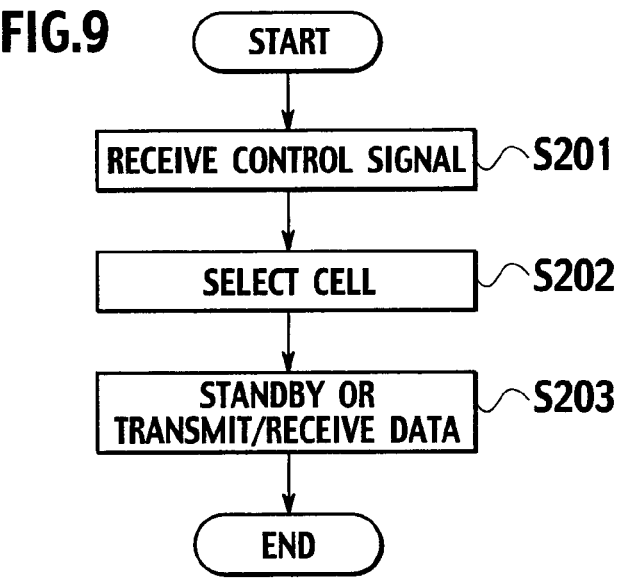
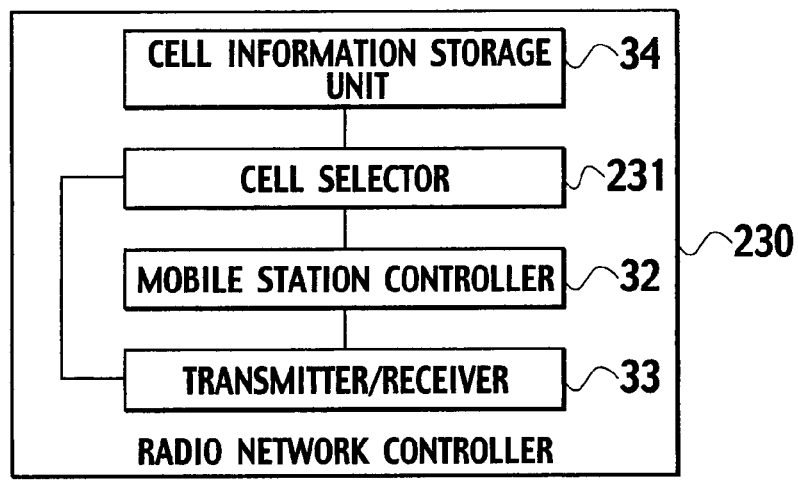
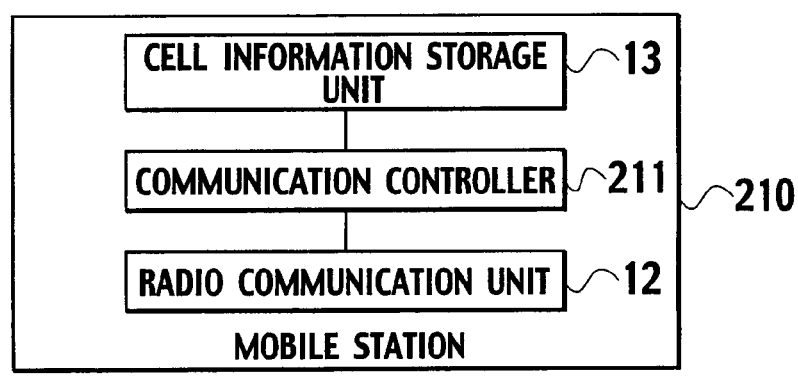

RADIO NETWORK CONTROLLER, MOBILE STATION, AND MOBILE COMMUNICATION METHOD

CROSS REFERENCE TO RELATED APPLICATIONS

This application is a division of and is based upon and claims the benefit or priority under 35 U.S.C. §120 for U.S. Ser. No. 11/199,249, filed Aug. 9, 2005 which claims the benefit of priority under 35 U.S.C. §119 from Japanese Patent Application No. 2004-233889, filed Aug. 10, 2004, JP 2004-278310, filed on Sep. 24, 2004, and JP 2005-041415, filed on Feb. 17, 2005; the entire contents of each which are incorporated herein by reference.

BACKGROUND OF THE INVENTION

1. Field of the Invention

The present invention relates to a radio network controller, a mobile station, and a mobile communication method.

2. Description of the Related Art

Conventionally, a service (Multimedia Broadcast Multicast Service, hereinafter, referred to as an "MBMS") has been provided, in which multimedia contents are broadcasted or multicasted to plural mobile stations (3GPP TSG-RAN, "TS25.346 V6.1.0 Introduction of Multimedia broadcast multicast service (MBMS) in Radio access network (RAN)", June, 2004). In the MBMS, a frequency at which data is transmitted by the MBMS is notified to the mobile station via a radio access network. Due to this, it is possible for the mobile station not receiving data currently through the MBMS to receive data through the MBMS by carrying out a frequency handover to the notified frequency.

However, the mobile station that has started to use a specific frequency at which data is transmitted through the MBMS continues to be present at the frequency also after data reception through the MBMS unless the communication quality at the frequency is deteriorated. Therefore, traffic concentrates on a specific frequency and a deviation in the traffic occurs among frequencies. Such a problem arises not only in the MBMS, but also, for example, when the mobile station receives data to be transmitted by using a specific frequency such as a case of a high speed downlink packet access (HSDPA) etc or the like. Concentration of the traffic on one part of the frequencies as described above brings about a waste in utilizing radio resources.

SUMMARY OF THE INVENTION

An object of the present invention is to prevent traffic from concentrating after data reception and to effectively utilize radio resources.

A radio network controller according to an embodiment of the present invention includes a cell selector configured to select a cell to use by a mobile station after data reception, and a mobile station controller configured to control the mobile station to communicate by radio using the cell selected by the cell selector after the data reception.

The radio network controller can select a cell that the mobile station uses after data reception and make the mobile station to use the selected cell. Therefore the radio network controller can prevent traffic from concentrating and effectively utilize the radio resources by distributing mobile stations to plural cells after data reception.

A mobile station according to an embodiment of the present invention includes a radio communication unit configured to communicate by radio, and a communication controller configured to select a cell to use after data reception and control the radio communication unit to communicate by radio using a selected cell after the data reception.

The mobile station can select a cell that the mobile station uses after data reception and communicate by radio using the selected cell after data reception. Therefore, the mobile stations can be distributed to plural cells after data reception. As a result, the mobile station can prevent traffic from concentrating and effectively utilize radio resources.

A mobile communication method according to an embodiment of the present invention includes selecting a cell to use by a mobile station after data reception, and communicating by radio using a selected cell after the data reception by the mobile station.

BRIEF DESCRIPTION OF THE DRAWINGS

FIG. 9 is a flow chart showing an operation procedure of the mobile station according to an embodiment of the present invention.

FIG. 10 is a block diagram showing a radio network controller according to a modification example of the present invention.

FIG. 11 is a block diagram showing a mobile station according to a modification example of the present invention.

DETAILED DESCRIPTION OF THE EMBODIMENTS (Mobile Communication System)

Figure 1:
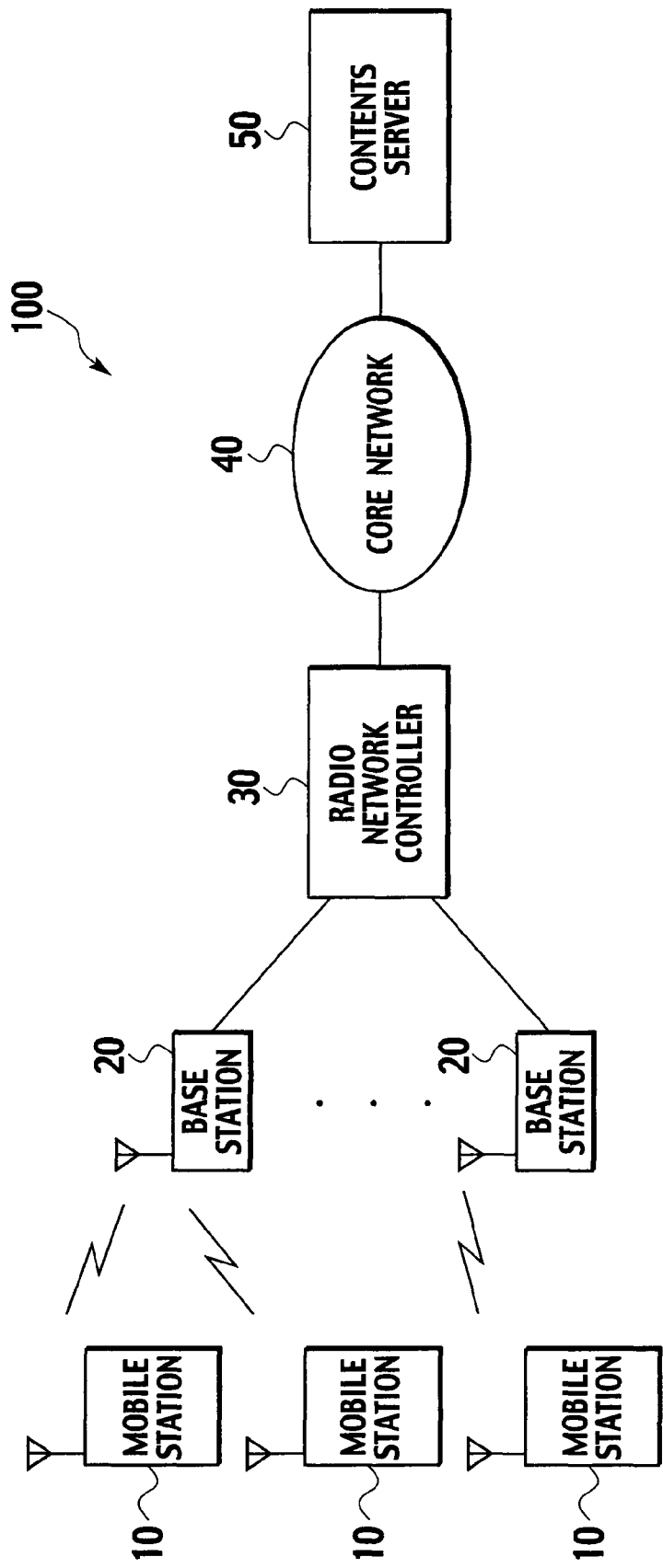
FIG. 1 is a diagram showing a mobile communication system according to an embodiment of the present invention.

As shown in FIG. 1, a mobile communication system 100 includes mobile stations 10, base stations 20, a radio network controller 30, a core network 40, and a contents server 50.

The contents server 50 provides an MBMS (Multimedia Broadcast Multicast Service) that broadcasts or multicasts multimedia contents and the like to plural mobile stations 10. The contents server 50 broadcasts or multicasts the multimedia contents and the like to the plural mobile stations 10 via the core network 40, the radio network controller 30, and the base stations 20.

The radio network controller 30 controls radio communication between the base stations 20 and the mobile stations 10. The base stations 20 and the mobile stations 10 communicate by radio under control by the radio network controller 30. The mobile stations 10 transmit/receive data or control signals to/from the radio network controller 30 and the contents server 50 via the base stations 20.

The mobile communication system 100 covers plural areas. Each area is divided into plural cells by a position and frequency. In the mobile communication system 100, one area is divided by plural frequencies and one area has a layered structure based on plural frequencies. Each area divided by frequencies is further divided by a position and thus plural cells are formed. As described above, the cell is a communication region divided by the frequency and position.

The mobile communication system 100 providing the MBMS performs an FLC process (Frequency Layer Convergence process). The FLC process includes notifying the mobile station 10 of the frequency at which the data of the MBMS is transmitted (hereinafter, referred to as a "target frequency") and making the mobile station 10 to receive the data of the MBMS at the target frequency. The radio network controller 30 transmits a control signal to the mobile station 10 via the base station 20, thereby the FLC process is performed. Specifically, the radio network controller 30 notifies the mobile station 10 of the target frequency by transmitting a control signal called LCI (Layer Convergence Information) to the mobile station 10. The LCI can include an offset value of the target frequency from the frequency, which the mobile station 10 currently uses (hereinafter, referred to as an "in-use frequency"), for example.

Figure 2:
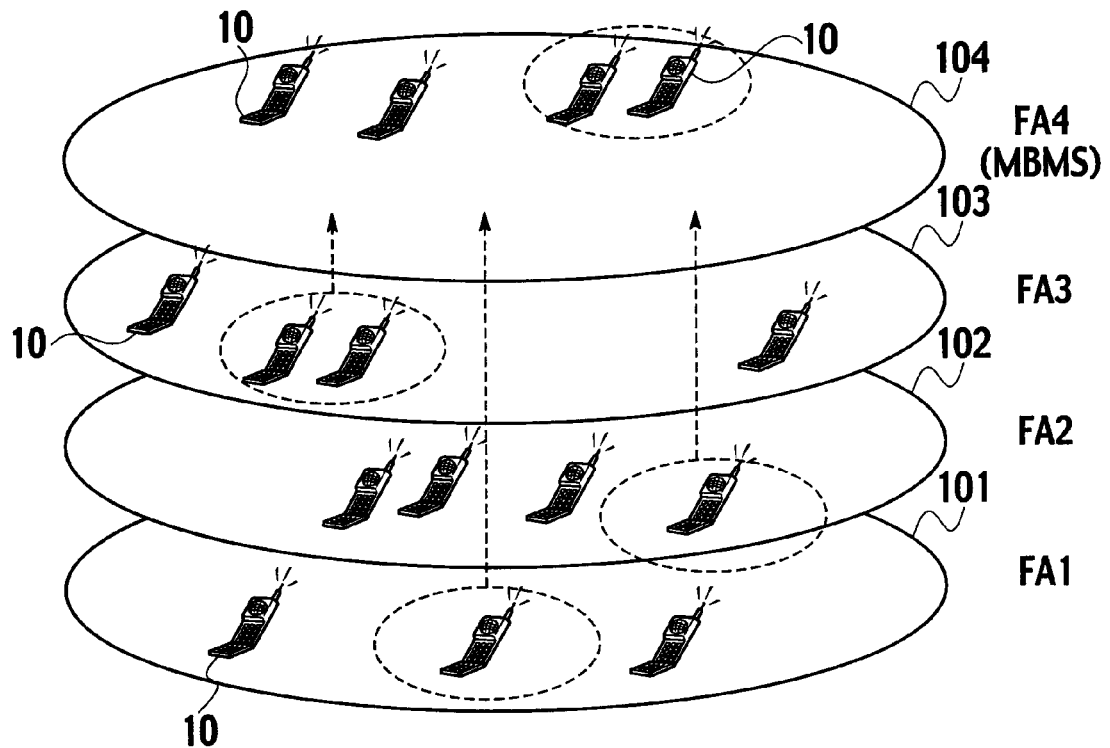
FIG. 2 is a diagram showing a state before a frequency handover according to an embodiment of the present invention.
Figure 3:
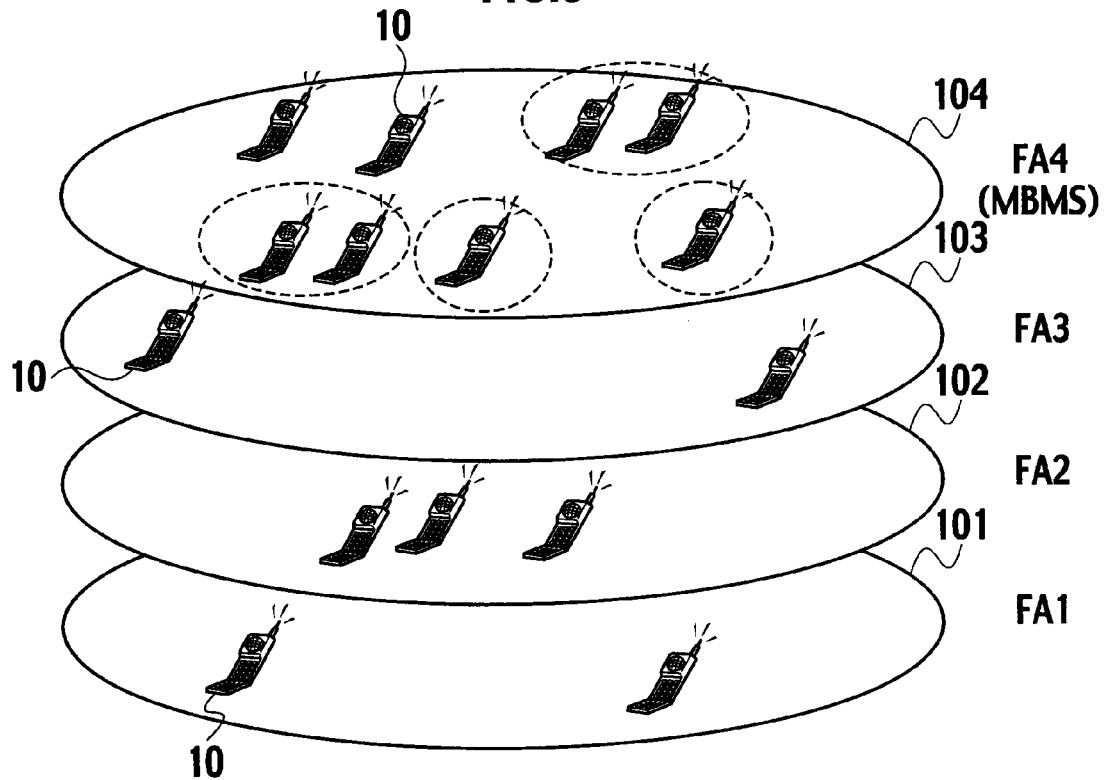
FIG. 3 is a diagram showing a state after a frequency handover according to an embodiment of the present invention.

The FLC process is explained in detail using FIG. 2 and FIG. 3. FIG. 2 and FIG. 3 show cells 101 to 104 divided by four frequencies FA1 to FA4. Although not shown schematically, there exist plural cells of which the position is different at each of the frequencies FA1 to FA4.

As shown in FIG. 2, before data transmission by the MBMS, the mobile stations 10 are present at the respective cells 101 to 104 of the respective frequencies FA1 to FA4. When the data by the MBMS is transmitted using the frequency FA4, the radio network controller 30 notifies the mobile stations 10 of the target frequency FA4 via the base stations 20. The radio network controller 30 notifies the target frequency FA4 through an MCCH (MBMS Control CHannel) at each of the frequencies FA1 to FA4 via the base station 20. The MCCH is a broadcast channel for transmitting a control signal regarding the MBMS. For example, the LCI including the offset value of the target frequency FA4 from the in-use frequency FA3 is transmitted to the mobile stations 10 being present in the cell 103, and thus the target frequency is notified to the mobile stations 10.

The mobile stations 10 that intend to receive the data by the MBMS (the mobile stations circled by the dotted line in FIG. 2) receive the LCI transmitted through the MCCH. Then, the mobile stations 10 carry out a frequency handover to the target frequency FA4. In other words, the mobile stations 10 connect to the base station 20 that covers the cell 104 of the frequency FA4 and start radio communication using the frequency FA4. As a result of the frequency handover, as shown in FIG. 3, the mobile stations 10 that intend to receive the data by the MBMS move to the cell 104 of the frequency FA4. Then, the mobile stations 10 receive the data provided by the MBMS using the frequency FA4.

Figure 4:
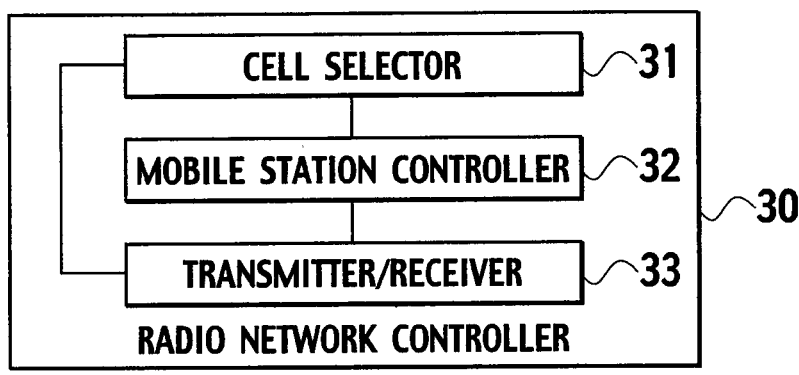
FIG. 4 is a block diagram showing a radio network controller according to an embodiment of the present invention.

Next, the radio network controller 30 and the mobile station 10 are explained in detail. As shown in FIG. 4, the radio network controller 30 includes a cell selector 31, a mobile station controller 32, and a transmitter/receiver 33. The transmitter/receiver 33 transmits/receives control signals and data to/from the mobile stations 10 via the base stations 20.

The cell selector 31 selects a cell to use by the mobile station 10 after data reception. The cell selector 31 preferably selects a cell to use by the mobile station 10 after at least one of reception of data by broadcast, reception of data by multicast, and reception of data transmitted by a high speed downlink packet access (HSDPA). According to this, the radio network controller 30 can distribute mobile stations, which receive data transmitted using a specific frequency or data transmitted to the mobile station located at a specific position, such as broadcast, multicast, or data transmission by the HSDPA, and concentrate on a specific frequency or position, i.e., a specific cell, to cells having different frequencies and positions.

The cell selector 31 can select a cell to use after data reception based on, for example, at least one of a use history of the cell by the mobile station 10, a use status of radio resources in the cell, the number of mobile stations being present in the cell, a propagation path state in the cell, neighboring cell information about the cell neighboring the cell the mobile station 10 uses at the data reception, and communication quality in the cell. According to this, the radio network controller 30 can more appropriately distribute the mobile stations 10 in consideration of these kinds of information and more effectively utilize radio resources. The cell selector 31 can also select a cell randomly. According to this, a control load of the radio network controller 30 can be reduced.

The use history of the cell includes, for example, the cell in which the mobile station 10 has transmitted/received data thus far, the cell in which the mobile station 10 currently transmits/receives data, the cell in which the mobile station 10 has been standby thus far, the cell in which the mobile station 10 is currently standby, a presence period in the cell, a presence frequency in the cell, an order of using the cell, time of data transmission/reception, time of presence in the cell and the like.

The cell selector 31, when selecting a cell based on the use history of the cell, preferably selects a cell, of which the frequency is the same as that of the cell, in which the mobile station 10 was present just before data reception, and which the mobile station 10 used just before data reception, as a cell to use after data reception. According to this, the radio network controller 30 can return the mobile station 10 to the frequency that the mobile station 10 used just before the data reception. For example, the cell selection section 31 can select a cell, of which the frequency is the same as that of the cell the mobile station 10 used just before data reception, and which is usable at the current position of the mobile station 10, as a cell to use after data reception. Further, the cell selector 31 can also select a cell of which the presence period or the presence frequency is high.

The cell selector 31 can request the base station 20 via the transmitter/receiver 33 to notify the use history of the cell by the mobile station 10, the use status of radio resources in the cell, the number of mobile stations being present in the cell, the propagation path state in the cell, the communication quality in the cell and the like. Further, the cell selector 31 also can obtain neighboring cell information by determining a cell that the mobile station 10 uses at data reception based on the use history of the cell by the mobile station 10.

The cell selector 31 can select a cell to use by the mobile station 10 after data reception from among the plural cells. For example, the cell selector 31 can select a cell from the cells, of which the frequency is the same as that of the cell the mobile station 10 uses currently, and which neighbor the cell the mobile station 10 uses currently, the cells, which neighbor the cell the mobile station 10 uses currently, and of which the frequency is different from that of the cell the mobile station 10 uses currently, and the cells, of which the frequency is different from that of the cell the mobile station 10 uses currently, and which neighbor the cell the mobile station 10 uses currently.

In this manner, the cell selector 31 can select a frequency (hereinafter, referred to as a "preferred frequency") of the cell to use by the mobile station 10 after data reception.

The cell selector 31 may select one cell or plural cells as candidates. The cell selector 31 may set priorities of use when selecting plural cells. For example, the cell selector 31 can set the priorities based on at least one of the use history of the cell by the mobile station 10, the use status of radio resources in the cell, the number of mobile stations being present in the cell, the propagation path state in the cell, the neighboring cell information, and the communication quality in the cell.

Further, the cell selector 31 may set the priorities randomly. For example, the cell selector 31 can randomly determine a first selection candidate from among the cells of which the frequency is usable by the mobile station 10, and set the highest priority to the first selection candidate. The cell selector 31 can randomly determine a second selection candidate and subsequent candidates, and set the priorities to the candidates sequentially.

Further, the cell selector 31 may set the priorities by the value calculated from the following Expression (1) using an identifier inherent to the mobile station 10.

$$\text{Identifier of the mobile station modN} \quad \text{Expression (1)}$$

(Where N=the number of cells the mobile station can use)

As an identifier inherent to the mobile station 10, for example, an IMSI (International Mobile Subscriber Identity) and the like can be used. The cell selector 31 stores a table of correspondence between the calculated values of Expression (1) and the identifiers (cell IDs) for identifying a cell in advance. Then, the cell selector 31 calculates Expression (1), refers to the table of correspondence based on the calculated value, and selects a cell having a cell ID corresponding to the calculated value.

Further, the cell selector 31 can select cells to use by plural mobile stations 10 after data reception and set ratios (hereinafter, referred to as a "mobile station ratio") of the mobile stations that should use respective cells to the selected cell. For example, the cell selector 31 can set the mobile station ratio of the cell 101 to 40%, that of the cell 102 to 20%, that of the cell 103 to 30%, and that of the cell 104 to 10%, respectively. The cell selector 31 can set a high mobile station ratio to a cell, which the cell selector 31 intends to make many mobile stations to use, for example, such as a cell where available radio resources are rich, the number of mobile stations being present thereat is small, the propagation path state is good, the communication quality is good and the like. On the other hand, the cell selector 31 can set a low mobile station ratio to a cell, in which a few mobile stations can use, for example, such as a cell where available radio resources are poor, the number of mobile stations being present thereat is large, the propagation path state is not good, the communication quality is not good and the like.

According to this, the radio network controller 30 can make many mobile stations to use the cell that the radio network controller 30 intends to make many mobile stations to use, and suppress the number of mobile stations that use the cell in which only a few mobile stations can use. Therefore, the radio network controller 30 can distribute the mobile stations 10 appropriately.

The cell selector 31 may select a cell for each mobile station 10, a cell for a group of specific mobile stations in common, or a cell for all mobile stations that have received the data transmitted by the MBMS or HSDPA in common.

The cell selector 31 inputs information (hereinafter, referred to as "selected cell information") about the selected cell into the mobile station controller 32. As selected cell information, for example, an identifier for identifying a cell (cell ID), an identifier of a base station that covers the cell (base station ID), control information for receiving signals in the cell, the frequency (preferred frequency) of the cell, the positional information of the cell and the like can be used. These kinds of information may be used alone or in combination. As a frequency (preferred frequency) of the cell, for example, an absolute value of the frequency of the selected cell (2.0 GHz etc.), or a relative value of the frequency of the selected cell (the offset value of the frequency of the selected cell from the in-use frequency etc.) can be used. Further, the selected cell information can include the priorities, the mobile station ratio and the like. The cell selector 31 inputs the neighboring cell information as well into the mobile station controller 32. The preferred frequency specified for the mobile station 10 is particularly referred to as "preferred frequency information" in the selected cell information.

The mobile station controller 32 controls the mobile station 10 to communicate by radio using the cell selected by the cell selector 31 after the data reception. The mobile station controller 32 generates a control signal for notifying the mobile station 10 of the selected cell and transmits the control signal to the mobile station 10 via the transmitter/receiver 33. In this manner, the mobile station controller 32 notifies the mobile station 10 of the selected cell and controls the mobile station 10.

The mobile station controller 32 generates a control signal by using the selected cell information obtained from the cell selector 31. The mobile station controller 32 generates, for example, a control signal including the selected cell information, which is transmitted through radio channels such as a dedicated channel that is individual for each mobile station 10, a common channel for the plural mobile stations 10 in common, and a broadcast channel.

Figure 5A:
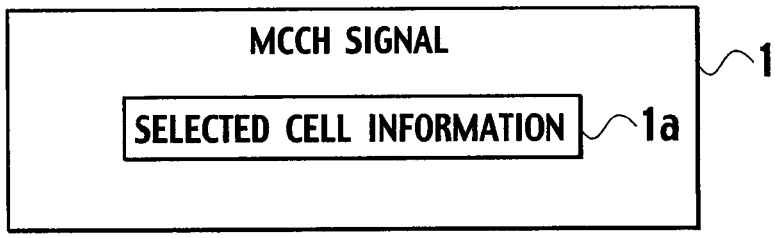
FIG. 5A is a diagram showing an MCCH signal according to an embodiment of the present invention and FIG. 5B is a diagram showing a BCCH signal according to an embodiment of the present invention.
Figure 5B:
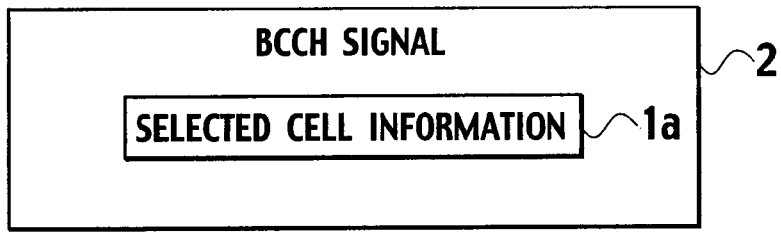

The mobile station controller 32 can, for example, generate an MCCH signal 1 including the selected cell information 1a as shown in FIG. 5A. The MCCH signal 1 is a control signal regarding the MBMS transmitted through the MCCH. The mobile station controller 32 may generate a BCCH signal 2 including the selected cell information 1a as shown in FIG. 5B. The BCCH signal 2 is a control signal transmitted through a control channel called a BCCH (Broadcast Control CHannel). Alternatively, the mobile station controller 32 may generate a control signal including the selected cell information transmitted through the control channel of the HSDPA. The mobile station controller 32 may generate the control signal including the neighboring cell information.

In addition, when the cell selector 31 selects s a frequency of the cell to use by the mobile station 10 after the data reception, the mobile station controller 32 can control the mobile station 10 to communicate by radio using the cell of the selected frequency after data reception by notifying the mobile station of the preferred frequency information including the specified preferred frequency as the selected cell information. In this case, the mobile station controller 32 may generate a control signal including the preferred frequency information as the selected cell information.

The mobile station controller 32 carries out a mapping of the generated control signal onto the corresponding radio channel. The mobile station controller 32 inputs the generated control signal into the transmitter/receiver 33 and causes the transmitter/receiver 33 to transmit it to the mobile station 10.

The transmitter/receiver 33 transmits the control signal obtained from the mobile station controller 32 to the mobile station 10 in accordance with an instruction by the mobile station controller 32. The mobile station controller 32 notifies the mobile station 10 of the selected cell information by making the transmitter/receiver 33 to transmit the control signal including the selected cell information to the mobile station 10 at either timing, that is, in a standby state before data reception, during data reception, or after data reception. In this manner, the mobile station controller 32 can easily control the mobile station 10 to use the selected cell after data reception by transmitting the control signal including the selected cell information about the cell, which should be used after data reception, to the mobile station 10.

Figure 6:
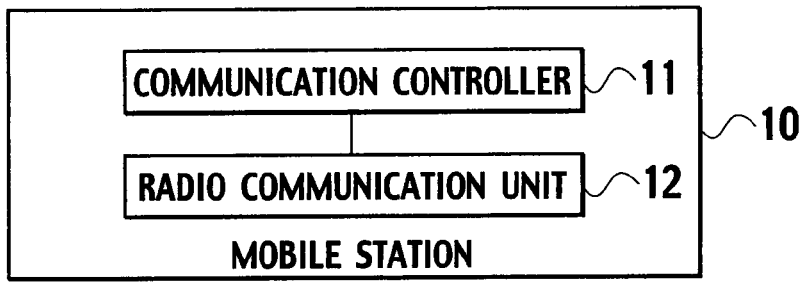
FIG. 6 is a block diagram showing a mobile station according to an embodiment of the present invention.

As shown in FIG. 6, the mobile station 10 includes a communication controller 11 and a radio communication unit 12. The radio communication unit 12 communicates by radio with the base station 20. The radio communication unit 12 receives a control signal including the selected cell information transmitted from the radio network controller 30 via the base station 20. The radio communication unit 12 inputs the received control signal into the communication controller 11. The radio communication unit 12 communicates by radio under the control by the communication controller 11.

The communication controller 11 selects a cell to use after data reception, and controls the radio communication unit 12 to communicate by radio using the selected cell after data reception. The communication controller 11 can select a cell to use based on the selection result of the cell to use after data reception by the radio network controller 30. In this case, the communication controller 11 controls the radio communication unit 12 based on the control signal notifying the selected cell from the radio network controller 30. Due to this, the mobile station 10 can easily control by using the selection result from the radio network controller 30.

The communication controller 11 obtains the control signal from the radio communication unit 12. The communication controller 11 obtains the selected cell information from the control signal as the selection result. When the number of the cell specified by the selected cell information is one, the communication controller 11 determines that the above cell is a cell to use after data reception. When the number of the cell specified by the selected cell information is plural, the communication controller 11 can select a cell to use after data reception from among the plural cells selected by the radio network controller 30 based on at least one of the use history of the cell, the use status of radio resources in the cell, the number of mobile stations being present in the cell, the propagation path state in the cell, the neighboring cell information about the cell neighboring the cell to use at data reception, and the communication quality in the cell. Due to this, the mobile stations 10 can be more appropriately distributed in consideration of these kinds of the information and more effectively utilize the radio resources. The communication controller 11 also can randomly select a cell to use from among the notified cell candidates. This enables the control load of the mobile station 10 to be reduced.

The communication controller 11 can request the base station 20 via the radio communication unit 12 to notify the use history of the cell, the use status of radio resources in the cell, the number of mobile stations being present in the cell, the propagation path state in the cell, the communication quality in the cell and the like. The communication controller 11 can obtain the neighboring cell information from the control signal from the radio network controller 30.

When the priorities of the cell are included in the selected cell information, the communication controller 11 can select a cell to use in accordance with the priorities. For example, the communication controller 11 determines required values for the use status of radio resources in the cell, the number of mobile stations being present in the cell, the propagation path state in the cell, the communication quality in the cell, etc in advance. Then the communication controller 11 confirms whether or not the use status of the radio resources in the cell, the number of mobile stations being present in the cell, the propagation path state in the cell, the communication quality in the cell, etc., satisfy the required values, in order of the priorities. At the point that a cell satisfying the required values has been detected, the communication controller 11 selects the above cell as a cell to use.

For example, when the cell using the frequency FA1 and the cell using the frequency FA2 are notified as candidates for a cell to use after data reception and the cell using the frequency FA1 having a higher priority than the cell using the frequency FA2, the communication controller 11 first checks the communication quality etc. in the cell of the frequency FA1. If the cell of the frequency FA1 satisfies the required value, the communication controller 11 selects the cell of the frequency FA1. On the other hand, if the cell of the frequency FA1 does not satisfy the required value, the communication controller 11 checks the cell of the frequency FA2.

When the mobile station ratios are included in the selected cell information, i.e., the selection result by the radio network controller 30 includes cells to use by the mobile stations 10 after data reception and ratios (mobile station ratios) of the mobile stations 10 using respective cells, the communication controller 11 can select a cell to use after data reception based on the mobile station ratios. The communication controller 11 can preferentially select a cell having a higher mobile station ratio. As a result, the mobile station 10 can use the cell having a high mobile station ratio as frequently as possible, which the radio network controller 30 intends to cause many mobile stations to use, and does not use the cell having a low mobile station ratio if possible, which is usable by only a few mobile stations. Therefore, the mobile stations 10 can be distributed properly.

In addition, when the selected cell information is preferred frequency information, i.e., the selection result by the radio network controller 30 includes a frequency of the cell to use by the mobile station 10 after data reception, the communication controller 11 can select the cell of the preferred frequency specified by the preferred frequency information as the cell to use after data reception. When the preferred frequency is not specified, the communication controller 11 may select the cell to use from all frequencies.

The communication controller 11 may select a cell without using the selection result by the radio network controller 30. For example, the communication controller 11 can determine a cell to use after data reception based on at least one of the use history of the cell, the use status of radio resources in the cell, the number of mobile stations being present in the cell, the propagation path state in the cell, the neighboring cell information, and the communication quality in the cell. For example, the communication controller 11 can select a cell of which the frequency is the same as that of the cell used just before the data reception as a cell to use after data reception. Due to this, the mobile station 10 can return the frequency, which the mobile station 10 used just before the data reception. For example, the communication controller 11 can select a cell, which has the same frequency as that of the cell used just before data reception and is usable at the current position of the mobile station 10, as a cell to use after data reception.

The communication controller 11 also can randomly select a cell. This enables the control load of the mobile station 10 to be reduced.

When the number of the cells specified by the selected cell information is plural, or the cell is selected without using the selection result by the radio network controller 30, the communication controller 11 may set the priority of the cell by itself. The communication controller 11 can set the priority based on at least one of the use history of the cell, the use status of radio resources in the cell, the number of mobile stations being present in the cell, the propagation path state in the cell, the neighboring cell information, and the communication quality in the cell.

Alternatively, the communication controller 11 may set the priority randomly. For example, the communication controller 11 can randomly determine a first selection candidate from among the cells of the frequency that the mobile station 10 can use and to give the highest priority to the first selection candidate. The communication controller 11 can randomly determine a second selection candidate and subsequent candidates, and set the priorities to the candidates sequentially. Further, the cell communication controller 11 may set the priorities by the value calculated from the above-mentioned Expression (1) using the identifier inherent to the mobile station 10. In this case, the communication controller 11 stores a table of correspondence between the values calculated by Expression (1) and the cell IDs in advance.

The case where the communication controller 11 sets the priorities to the cells in the order of the cell of the frequency FA3, the cell of the frequency FA2, the cell of the frequency FA4, and the cell of the frequency FA1 by using any one of the methods described above, that is, the case where the highest priority is set to the cell of the frequency FA3 and the lowest priority is set to the cell of the frequency FA1, is explained.

First, the communication controller 11 checks the communication quality, the propagation path state, etc., of the cell of the frequency FA3 having the highest priority and determines whether or not the cell of the frequency FA3 satisfies the required value. When the required value is satisfied, the communication controller 11 selects the cell of the frequency FA3. On the other hand, if the required value is not satisfied, the communication controller 11 determines whether or not the cell of the frequency FA2 having the second highest priority satisfies the required value similarly. In this manner, the communication controller 11 continues to check the state of the cells in the set priority order until the cell of the frequency that satisfies the required value is found.

The communication controller 11 controls the radio communication unit 12 to start a standby or start transmission and reception of new data after data reception by using the selected cell. The communication controller 11 preferably selects a cell to use after at least one of the reception of the data by the broadcast, the reception of the data by the multicast, and the reception of the data transmitted by the high speed downlink packet access.

For example, as shown in FIG. 3, the mobile station 10 receives the data provided by the MBMS in the cell 104 by using the frequency FA4. When having selected, for example, the cell 103 as a cell to use after data reception by the MBMS, the communication controller 11 instructs the radio communication unit 12 to carry out a frequency handover to the frequency FA3. The radio communication unit 12 connects to the base station 20 that covers the cell 103 of the frequency FA3 and starts radio communication using the frequency FA3.

Figure 7:
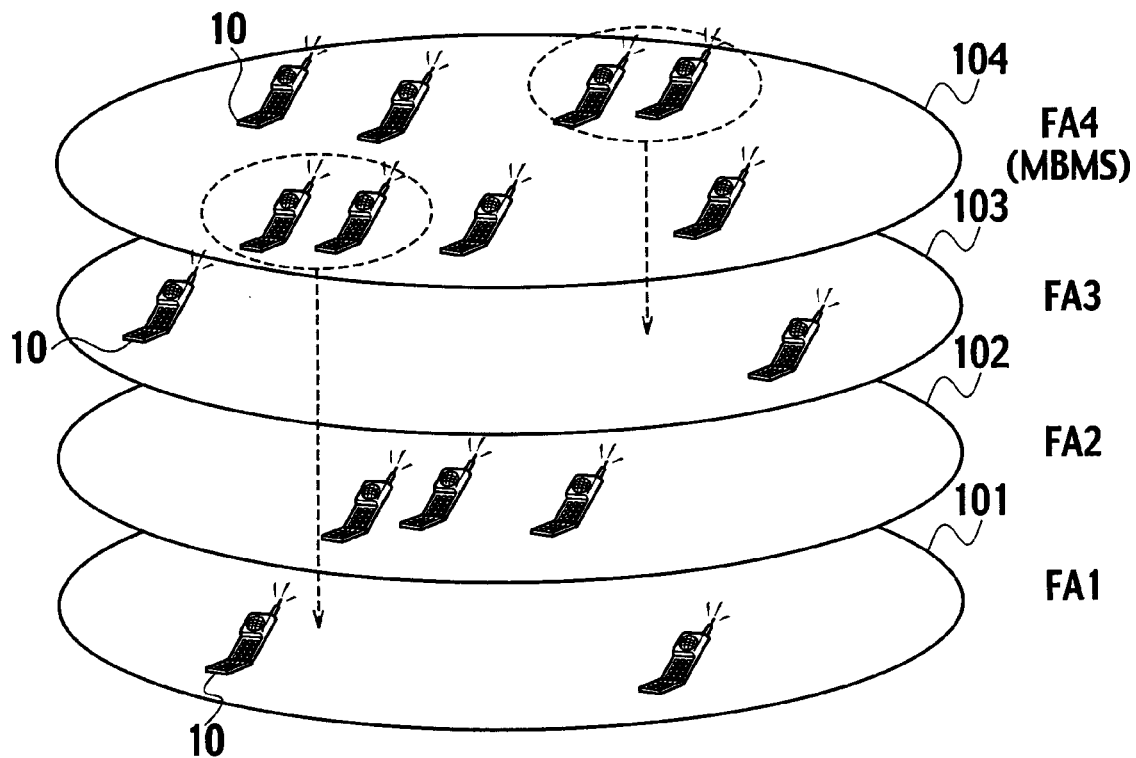
FIG. 7 is a diagram showing a state after data reception according to an embodiment of the present invention.

Due to this, as shown in FIG. 7, for example, after the data reception by the MBMS, the several mobile stations 10 (mobile stations circled by the dotted line in FIG. 7) switch their cells from the cell 104 to the cell 103 or the cell 101 for use, thus making the distribution possible. The cell selector 31 of the radio network controller 30 or the communication controller 11 of the mobile station 10 selects a cell that the mobile station 10 uses after data reception so that traffic does not concentrate on one cell but the mobile stations 10 are distributed to each cell as shown in FIG. 7.

(Mobile Communication Method)

Figure 8:
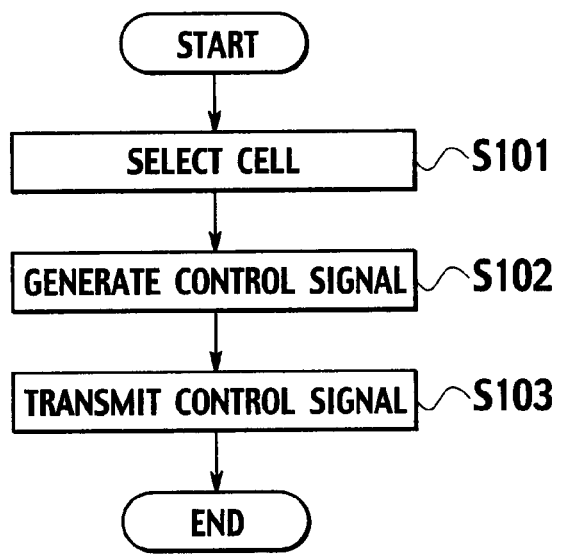
FIG. 8 is a flow chart showing an operation procedure of the radio network controller according to an embodiment of the present invention.

Next, the mobile communication method in the mobile communication system 100 is explained. FIG. 8 shows the operation procedure of the radio network controller 30. The radio network controller 30 selects a cell to use by the mobile station 10 after data reception (S101). The radio network controller 30 generates a control signal including the selected cell information (S102). The radio network controller 30 transmits the generated control signal to the mobile station 10 via the base station 20 (S103).

FIG. 9 shows the operation procedure of the mobile station 10. The mobile station 10 receives the control signal from the radio network controller 30 via the base station 20 (S201). The mobile station 10 selects a cell to use after data reception by using the cell selection information included in the received control signal (S202). After the data reception, the mobile station 10 starts a standby or starts transmission and reception of new data using the selected cell (S203). The mobile station 10 may omit the step (S201) and select a cell in its own way.

According to the mobile communication system 100, the radio network controller 30, the mobile station 10, and the mobile communication method described above, the radio network controller 30 can select a cell that the mobile station 10 is made to use after data reception and to cause the mobile station to use the selected cell after data reception. Further, the mobile station 10 can select a cell to use after data reception, and communicate by radio using the selected cell after data reception. Therefore, it is possible to distribute the mobile stations 10 to plural cells after data reception, to prevent the traffic from concentrating, and to utilize the radio resources effectively. For example, when the mobile station 10 receives data transmitted using a specific frequency or data transmitted to a mobile station located in a specific position like a case of receiving data by the MBMS or of receiving data by the HSDPA, the mobile stations 10 concentrating on a specific frequency or position can be distributed as evenly as possible to the cells of different frequencies or positions after data reception. Therefore, the traffic can be prevented from slanting to a specific frequency or position and an effective use of the radio resources can be expected.

(Modification Example)

Although the inventions have been described above by reference to certain embodiments of the inventions, the inventions are not limited to the embodiments described above. Modifications and variations of the embodiments described above will occur to those skilled in the art, in light of the above teachings. For example, a radio network controller 230 shown in FIG. 10 may be used. The radio network controller 230 includes a cell information storage unit 34, a cell selector 231, the mobile station controller 32, and the transmitter/receiver 33. The cell information storage unit 34 stores the use history of the cell relating to each mobile station 10. In this case, the cell selector 231 refers to the cell information storage unit 34 and selects the cell to use after data reception using the use history of the cell stored in the ell information storage unit 34. Due to this, the radio network controller 30 can easily select the cell using the use history. The cell selector 231 stores the use history obtained from the base station 20 in the cell information storage unit 34.

Alternatively, a mobile station 210 shown in FIG. 11 may be used. The mobile station 210 includes a cell information storage unit 13, a communication controller 211, and the radio communication unit 12. The cell information storage unit 13 stores the use history of the cell of the mobile station 210 itself. In this case, the communication controller 211 can refer to the cell information storage unit 13 and select a cell to use after data reception. The communication controller 211 stores the use history of the mobile station 210 itself in the cell information storage unit 13. Due to this, the mobile station 210 can refer to the cell information storage unit 13 and select a cell in its own way. The cell information storage units 34 and 13 may store information other than the use history obtained from the base station 20.

Further, the cell selector 31 may select a cell of the frequency other than the banned frequency as a cell to use after data reception, by determining the banned frequency. The banned frequency is a frequency, which the mobile station is banned from using after data reception. In this case, the mobile station controller 32 can control the mobile station 10 to communicate by radio using the cell of the frequency other than the banned frequency after data reception by notifying the mobile station 10 of the banned frequency.

Due to this, the radio network controller 30 can determine the banned frequency that the mobile station 10 is banned from using after data reception, and to cause the mobile station 10 to use the cell of the frequency other than the banned frequency. Therefore, the radio network controller 30 can distribute the mobile stations 10 to the cell of the frequency other than the frequency, which the radio network controller 30 intends to cause the mobile stations 10 not to use after data reception, prevent the traffic from concentrating, and effectively utilize the radio resources. The cell selector 31 can, for example, determine the banned frequency based on the use status of the frequencies. For example, the mobile station control section 32 can generate the control signals such as the MCCH signal and the BCCH signal including the banned frequency and notify the mobile station 10 of the banned frequency in the same manner as the case of notifying the cell selection information.

In this case, the communication controller 11 of the mobile station 10 can select a cell of the frequency other than the banned frequency determined by the radio network controller 30 as a cell to use after data reception. Due to this, the mobile stations 10 can be distributed to the cell of the frequency other than frequencies that the radio network controller 30 intends to cause the mobile stations 10 not to use. The communication controller 11 obtains the control signal including the banned frequency in the same manner as the case of the cell selection information. Then, the communication controller 11 can select a cell of the frequency other than the banned frequency included in the control signal as a cell to use.

What is claimed is:

1. A mobile station comprising:
   a radio communication unit configured to communicate by radio; and
   a communication controller configured to select a cell of a frequency other than a banned frequency, which the mobile station is banned from using and is notified by a radio network controller, as the cell to use after data reception and control the radio communication unit to communicate by radio using a selected cell after the data reception.

2. The mobile station according to claim 1, wherein the communication controller selects the cell to use after the data reception based on a selection result of the cell to use after the data reception by the radio network controller.

3. The mobile station according to claim 2, wherein
   the selection result includes the frequency of the cell to use after the data reception, and
   the communication controller selects the cell of the frequency as the cell to use after the data reception.

4. The mobile station according to claim 2, wherein,
   the selection result includes cells to use by mobile stations after the data reception and ratios of the mobile stations using respective cells, and
   the communication controller selects the cell to use after the data reception based on the ratios of the mobile stations.

5. The mobile station according to claim 1, wherein the communication controller selects the cell to use after the data reception based on at least one of a use history of the cell, a use status of radio resources in the cell, the number of mobile stations being present in the cell, a propagation path state in the cell, neighboring cell information about the cell neighboring the cell to use at the data reception, and communication quality in the cell.

6. The mobile station according to claim 5, wherein the communication controller selects a cell of a frequency used just before the data reception as the cell to use after the data reception.

7. The mobile station according to claim 5, further comprising:
   a cell information storage unit configured to store the use history of the cell, wherein
   the communication controller selects the cell to use after the data reception by referring to the cell information storage unit.

8. The mobile station according to claim 1, wherein the communication controller selects the cell to use after the data reception randomly.

9. The mobile station according to claim 1, wherein the communication controller selects the cell to use after at least one of reception of data by broadcast, reception of data by multicast, and reception of data transmitted by a high speed downlink packet access.

10. A mobile communication method comprising:
    selecting a cell to use by a mobile station after data reception, wherein selecting the cell includes selecting a cell of a frequency other than a banned frequency, which the mobile station is banned from using and is notified by a radio network controller, as the cell to use after the data reception; and
    communicating by radio using a selected cell after the data reception by the mobile station.

* * * * *